United States Patent [19]

Cattaneo

[11] Patent Number: 4,471,793
[45] Date of Patent: Sep. 18, 1984

[54] COMBINATION COLLAPSIBLE TENT AND FOLDABLE STORAGE CASE

[76] Inventor: Leonel Cattaneo, 1321 S. Mohawk Dr., Santa Ana, Calif. 92704

[21] Appl. No.: 443,298

[22] Filed: Nov. 22, 1982

[51] Int. Cl.³ ............................................. B60P 3/34
[52] U.S. Cl. ...................................... 135/88; 135/904
[58] Field of Search ................. 135/88, 89, 904, 114; 296/156, 159, 160, 161, 164

[56] References Cited

U.S. PATENT DOCUMENTS

| | | | |
|---|---|---|---|
| 2,530,450 | 11/1950 | Cast | 135/88 |
| 2,804,083 | 8/1957 | Wieber | 135/904 |
| 3,093,150 | 6/1963 | Schaftener | 135/88 |
| 3,095,231 | 6/1963 | Reed | 135/88 |
| 3,352,312 | 11/1967 | Martin | 135/88 |
| 3,620,235 | 11/1971 | Du Plessis | 135/904 |
| 4,223,689 | 9/1980 | Cox | 135/88 |
| 4,396,030 | 8/1983 | Ferguson | 135/88 |

FOREIGN PATENT DOCUMENTS 595326  6/1959  Italy ...................................... 135/88

Primary Examiner—Richard J. Apley
Assistant Examiner—S. R. Crow
Attorney, Agent, or Firm—Francis X. LoJacono

[57] ABSTRACT

A collapsible tent structure in combination with a foldable storage case designed for mounting on the top of a vehicle. The storage case also provides for the base or floor structure of the tent, the tent including a plurality of frame members which are hingedly mounted within the storage case. When the case is spread open horizontally, the frame members are locked into a vertical position to support a tent cover. The tent is erected while mounted on top of the vehicle.

1 Claim, 6 Drawing Figures

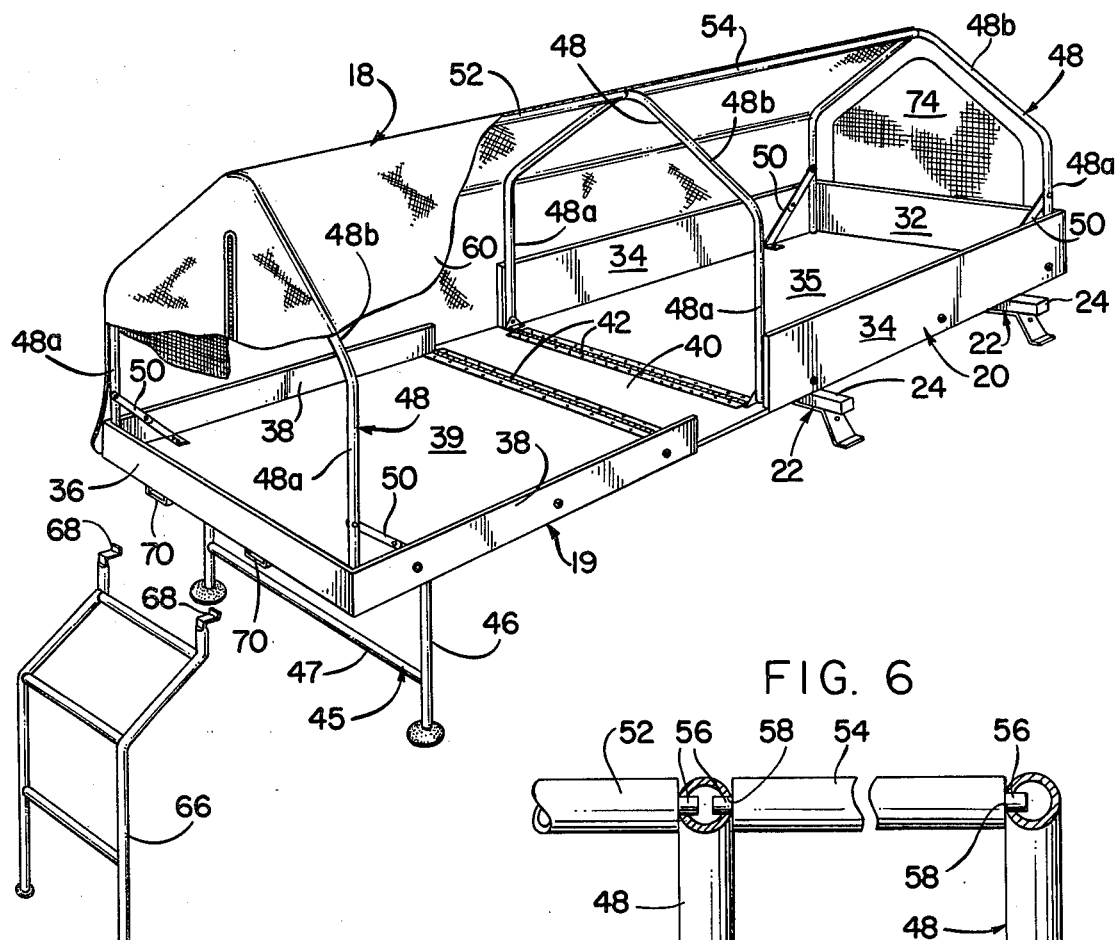
FIG. 3
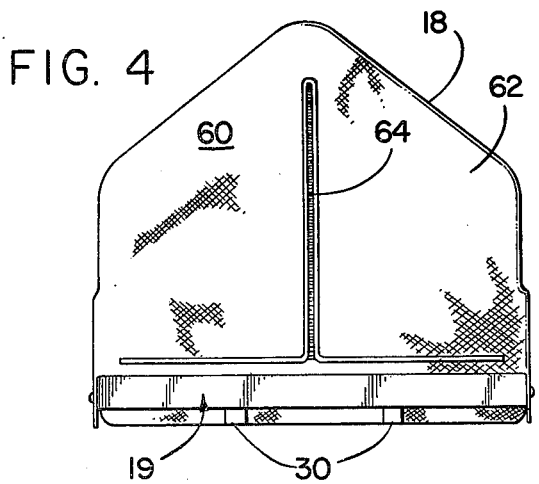
FIG. 4
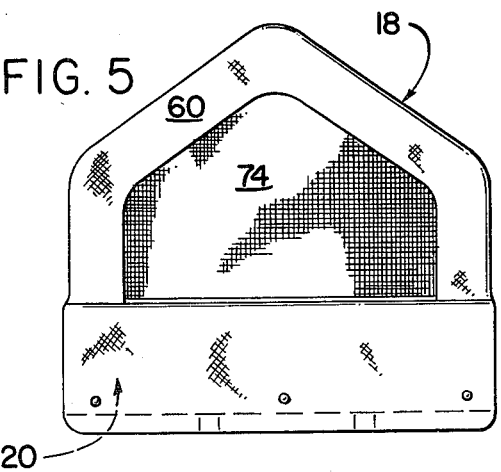
FIG. 5
FIG. 6

COMBINATION COLLAPSIBLE TENT AND FOLDABLE STORAGE CASE

BACKGROUND OF THE INVENTION

1. Field of the Invention

This invention relates generally to a tent structure, and more particularly to a tent structure that is foldable within a case which is mounted to the top of a vehicle, so that when the tent is erected the case becomes the floor of the tent.

2. Description of the Prior Art

There are many known types of tent apparatuses designed to provide shelter from the elements, and these vary according to individual requirements.

Tents used for camping are available in various sizes and range from simple to elaborate; and these tents are generally constructed to be erected on the ground surface. There are also tent apparatuses for use in backpacking, these usually being of very simple construction. Other tent units are of the mobile type designed to be attached to trailers towed by vehicles.

All of the above-mentioned tent structures are limited in their use and they have features that restrict them to particular applications which are very different from that of the present invention.

SUMMARY OF THE INVENTION

The present invention has for an important object to provide a very simple foldable tent structure which is mounted to the top or roof of an automobile, whereby it can be readily unfolded to become a sleeping compartment without the need for removing the overall tent structure from the vehicle. The tent comprises a foldable storage case having an upper and lower case section which are hingedly interconnected so as to unfold and define the tent floor. The tent cover is secured to a plurality of hinged frame members which are also foldable within the case. When unfolded, one case section is attached to and over the roof of the vehicle, and the other case section is supported by horizontally extended arm members as well as a removable depending leg structure which rests on the rear or trunk section of the vehicle.

Another object of the invention is to provide a tent structure that can be easily unfolded and erected for use in a relatively short period of time, and after use folded for storing in its case, there being no need for tools.

Still another object of the invention is to provide a tent structure of this type that remains with the vehicle so as to be always ready for use at any given time, this feature making it particularly handy for hunters and fishermen who frequently move from one area to another.

A further object of the invention is to provide a tent of this type that is not erected on the ground surface.

Another object of the invention is to provide a tent structure of this type that includes an access ladder for ease of access to and from the tent compartment.

Still a further object of the invention is to provide a tent of this character having relatively few structural parts.

It is still a further object of the invention to provide a tent of this character that is easy to fold, unfold, service and maintain.

Still another object of the invention is to provide a tent of this character that is relatively inexpensive to manufacture, needs no special tools for mounting, and is compatible with most automobile designs.

Another object of the present invention is to provide a tent structure of this type that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 3 is an enlarged perspective view of the tent structure in an erected mode, with portions of the tent cover removed to illustrate the placement of the frame structure;

FIG. 4 is a front-elevational view of the tent showing the entrance thereto;

FIG. 5 is a rear-elevational view thereof showing a window-like arrangement formed therein; and FIG. 6 is an enlarged partial cross-sectional view of the vertical frame member being interconnected by the horizontal frame members.

DESCRIPTION OF THE PREFERRED EMBODIMENT

Figure 1:
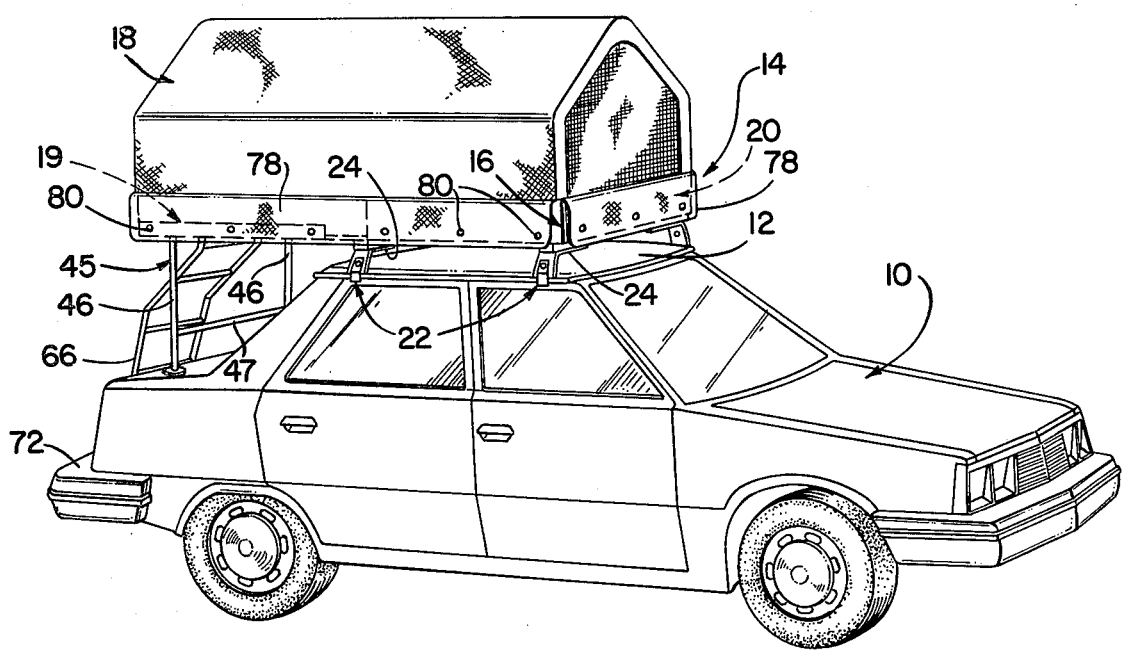
FIG. 1 is a pictorial view of the present invention in an unfolded erect mode and mounted on top of a vehicle.

Referring more particularly to FIG. 1, there is shown an automobile (generally indicated at 10) having a typical roof structure 12 on which is mounted and secured the present invention, a combination tent and storage structure designated at 14. In FIG. 1 the tent and storage structure is shown in an employed mode wherein the storage portion is unfolded to an open position, and the tent portion 18 is in an erected mode to define an enclosed compartment such as for sleeping therein.

Figure 2:
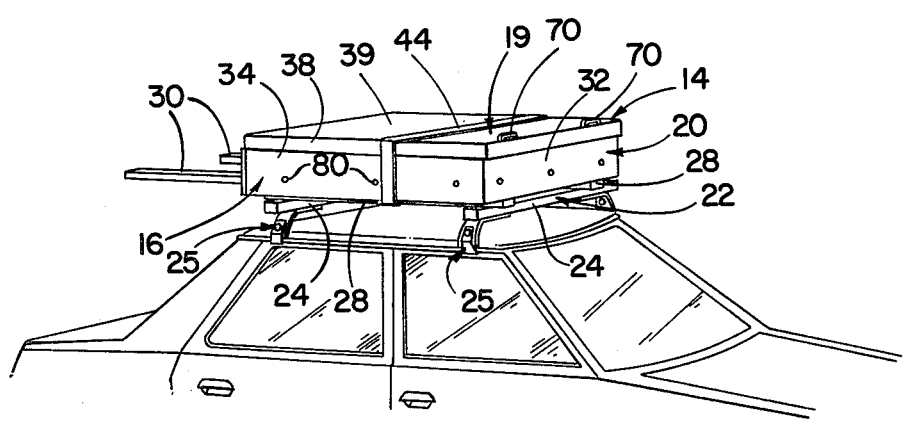
FIG. 2 is a pictorial view of the tent structure stored in its case and mounted to the roof of a vehicle.

FIG. 2, however, illustrates the present invention in a closed or stored mode, wherein the storage portion is employed as a case 16 having a first cover section 19 and a second receptacle section 20. Accordingly, the tent portion 18 is folded and stored within the case.

The storage portion or case 16 is removably attached to vehicle 10 by suitable mounting means 22. The preferable mounting means is shown as a pair of transverse bracket members 24 which include securing means 25 of any suitable type known in the art which would clamp them to the longitudinal drain channels that are part of the vehicle roof perimeter.

The bottom or receptacle section 20 of the case can be secured to bracket members 24 in any suitable manner, or can be mounted first to a pair of longitudinal support bars 28, as illustrated. These bars 28 provide space between the underside or bottom of receptacle section 20 and the bracket members 24, whereby a pair of extended support brace members 30 are positioned and allowed to extend rearwardly of the storage case.

Bottom section 20 comprises a front wall 32, side walls 34, and floor 35, the upper or cover section 19 being formed having a front wall 36, side walls 38, and cover wall 39. Both sections 19 and 20 are provided with the same hinged rear wall 40, which is hinged to floor 35 and to cover wall 39 by hinges 42. Various means can be employed to secure cover section 19 to the fixed bottom section 20 when in a closed mode. The type of securing means shown is a strap 44 which is positioned about sections 19 and 20, respectively.

When the tent is to be erected as illustrated in FIGS. 1 and 3, strap 44 is removed and the cover section 19 of the storage case is folded back over the rear of the vehicle so as to be supported on the extended brace members 30. At this time, an additional brace or support means 45 are utilized, these being defined by a pair of leg members 46 interconnected to each other by a spacer strut 47. The leg members are positioned between case cover 19 and the rear portion of vehicle 10, as seen in FIG. 1.

With the case opened to a horizontal position as seen in FIG. 3, the tent is unfolded and becomes accessible for use. The tent comprises a plurality of frame members 48, each having an inverted substantially U-shaped configuration, and defined by oppositely disposed parallel leg members 48a and an intermediate prop portion 48b. As seen in FIG. 3, there are three frame members, the first or front frame member being supported adjacent the front and side walls 36 and 38, respectively, of the case cover 19. A second or rear frame member 48 is pivotally attached adjacent the front wall 32 of the lower case section 20. Each of these frame members is held in a raised vertical position by locking means comprising a pair of collapsible strut members 50. A third or middle frame member is provided which is hingedly mounted to the rear of the lower fixed case section 20. The locking means for the center or middle frame member comprises a pair of horizontal truss members 52 and 54. Truss member 52 is mounted between the first or front frame member and the middle frame member, while truss member 54 is mounted between the middle frame member and the rear frame member.

As FIG. 6 illustrates, each truss member 52 and 54 is provided with a projecting pin 56 at the terminating end, the pins being adapted to be received in corresponding holes 58 disposed in the respective frame member 48. Thus, the truss members are longitudinally positioned along the length of the unfolded case, so as to be centrally positioned thereover. Accordingly, a canopy-like structure is formed by covering the frame members with a material 60 which then defines the tent enclosure or compartment. It is contemplated that the tent 60 can be constructed from many suitable fabrics, but preferably a canvas or lightweight nylon.

Hence, it can be understood that after the case sections are spread open to the horizontal position in order to provide the floor structure one then raises each end of frame member 48, locking them into place, and then raises the center or middle frame member and interconnects each truss member 52 and 54, as shown. The tent cover is then completely supported by the erected frame members.

The end of the tent cover that extends over the rear of the vehicle is provided with a door-like opening, the end wall 64 of the cover being cut to receive a closure means such as zipper 64 which is sewn thereon for opening and closing the doorway.

To further aid in ease of access to the tent compartment, there is additionally provided a stepladder 66 which includes connecting means such as hook members 68 that couple to brackets 70 affixed to upper case section 19. The ladder is connected at one end to the tent structure, the opposite end thereof being mounted on the back bumper 72 of the vehicle 10.

The tent cover 60 is also provided with a window section 74 formed in the opposite end from the door section of the tent.

Cover 60 further includes depending flange members 78 which are secured along the outer side of the case sections, the means for securing the flange members being defined by snap buttons 80.

Once the tent has been erected, any suitable sleeping means can be employed such as sleeping bags (not shown). The unrolled sleeping bags are placed upon the tent base or flooring formed by the two sections of the opened case.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. In combination, a collapsible tent structure and a foldable storage case adapted to be mounted and supported on the roof of a vehicle in both a stored and an erected mode, comprising:

a foldable storage case having a fixed lower section, a hinged upper section, and an interconnecting hinged wall member;

means for mounting said storage case to the roof of said vehicle;

a tent structure having a plurality of frame members transversely disposed in said storage case;

wherein said frame members include a first frame member adapted to be vertically mounted in the forward end of said upper section, a second frame member adapted to be vertically mounted to the forward end of said lower section, and a third frame member centrally positioned between said first and second frame members;

means for vertically positioning said frame members relative to said upper section and said lower section, when said sections are spread open in a horizontal mode, said means comprising collapsible strut members attached to said first and second frame members, and a pair of horizontal truss members connected between said first and second frame members and said third centrally positioned frame member;

a cover adapted to be supported by said frame members to define the tent compartment, said horizontally positioned case sections further defining the floor of said tent structure;

wherein said cover includes an access door at one end thereof and a window means at the opposite end thereof, and depending flange members adapted to be secured to the sides of said upper and lower sections of said case;

means for supporting said upper section of said case when in a spread-open, horizontal position;

wherein said supporting means for said upper section comprises a pair of brace members which extend longitudinally and outwardly from said roof and over the rear of said vehicle; and a pair of joined parallel leg members adapted to be removably positioned between said upper section and the rear portion of said vehicle; and means for pivotally attaching said frame members to said respective sections.

* * * * *